United States Patent [19]
Schneider et al.

[11] 3,997,646
[45] Dec. 14, 1976

[54] PROCESS FOR THE PRODUCTION OF POLYAMIDE MOULDINGS

[75] Inventors: Kurt Schneider; Helmut Vogel, both of Krefeld; Wolfgang Meyer, Rheinhausen; Bert Brassat, Krefeld, all of Germany

[73] Assignee: Bayer Aktiengesellschaft, Leverkusen, Germany

[22] Filed: May 21, 1974

[21] Appl. No.: 472,054

Related U.S. Application Data

[63] Continuation of Ser. No. 282,102, Aug. 21, 1972, abandoned.

[30] Foreign Application Priority Data

Aug. 21, 1971 Germany .......................... 2141986

[52] U.S. Cl. .......................... 264/176 R; 260/78 L; 264/40.6; 264/329; 264/331; 264/349
[51] Int. Cl.² ...................... B29B 5/04; B29F 1/04; B29F 3/02
[58] Field of Search ............ 264/349, 331, 329, 40, 264/176 R; 260/78 L

[56] References Cited

UNITED STATES PATENTS

| | | | |
|---|---|---|---|
| 3,121,768 | 2/1964 | Boyer | 264/331 |
| 3,200,095 | 8/1965 | Wichterle et al. | 260/78 L |
| 3,239,490 | 3/1966 | Gee et al. | 260/78 L |
| 3,492,275 | 1/1970 | Bigot et al. | 260/78 L |
| 3,634,574 | 1/1972 | Reinking et al. | 260/78 L |
| 3,676,544 | 7/1972 | Reinking et al. | 264/349 |

*Primary Examiner*—Jeffery R. Thurlow
*Attorney, Agent, or Firm*—Plumley and Tyner

[57] ABSTRACT

An improved process for the production of polyamide mouldings by activated, anionic polymerisation of lactams having at least five ring members by means of screw injection-moulding machines and screw extruders, the improvement comprises polymerising the lactam melt containing an activator and a catalyst partially in a stirrer unit up to a relative viscosity of at least 1.4 measured at 25° C on a 1% by weight solution of the polyamide in cresol.

2 Claims, 1 Drawing Figure

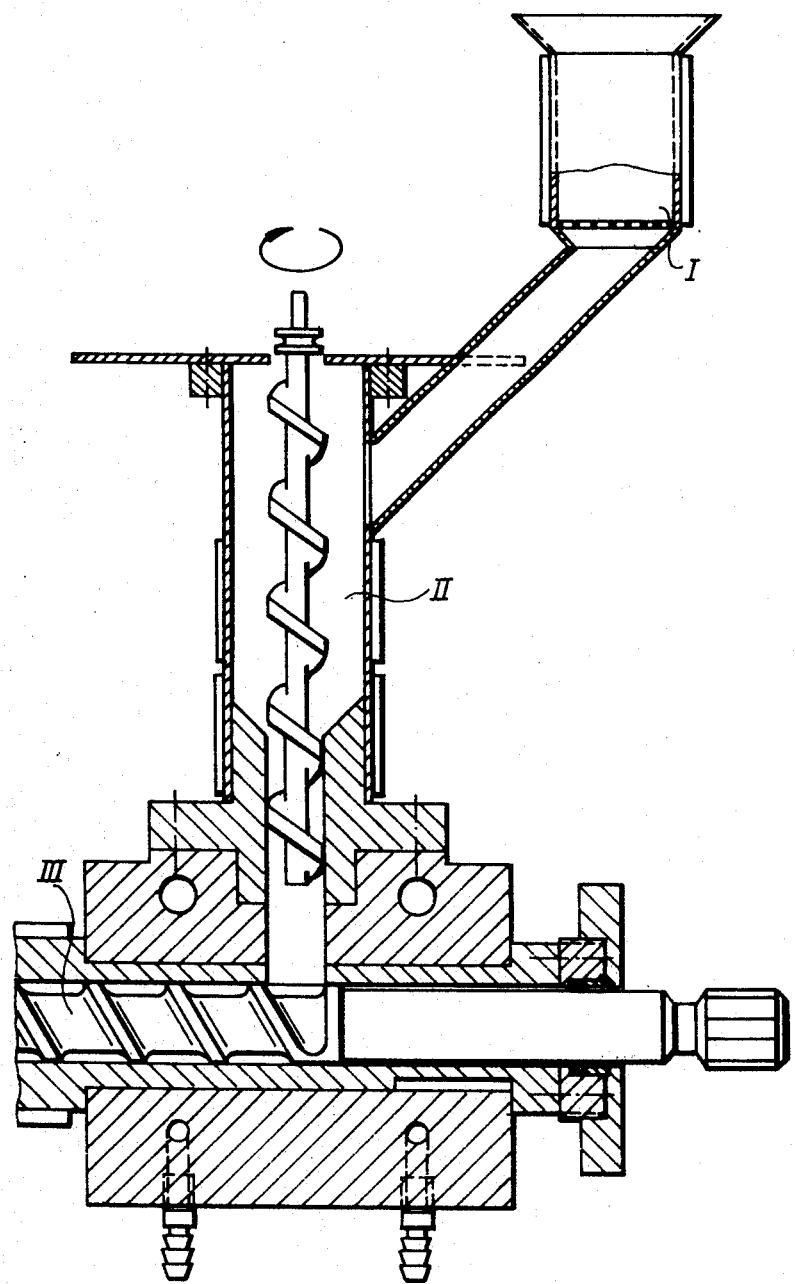

PROCESS FOR THE PRODUCTION OF POLYAMIDE MOULDINGS

This is a Continuation, Ser. No. 282,102 filed Aug. 21, 1972 now abandoned.

This invention relates to an improved process for the production of polyamide mouldings by the activated, ionic polymerisation of lactams in injection-moulding machines and extruders.

It is known that screw pre-plasticisation units can be used in the processing of plastics. The screw plasticising unit is arranged at an angle of 45° relative to the injection-moulding barrel or extruder and the high molecular weight granulate is fused and homogenised in the plasticising unit before it is delivered to the processing unit.

These combined processing machines are unsuitable for the anionic polymerisation of lactams. Although the polymerisable mixture can be fused in the screw plasticising unit, it cannot be delivered by the feed screw in the polymerisation or processing unit on account of its low viscosity.

Accordingly, processes have been described (e.g. Deutsche Offenlegunsschrift 1,927,923 and Deutsche Offenlegungsschrift 1,927,922) in which this problem is eliminated insofar as the melt is delivered under pressure to the feed zone of the processing machines. But these processes have the disadvantage however, that the entire system has to be sealed which frequently gives rise to disturbances. Furthermore, considerable difficulties are involved in the introduction to the melt of strengtheners or fillers.

Surprisingly, it has now been found that there is no need for delivery of the melt to be carried out under pressure providing the polymerisable melt is pre-polymerised in a stirrer unit to increase its viscosity, delivered by the feed screw and uniformly polymerised to completion.

Accordingly, the present invention relates to an improved process for the production of polyamide mouldings by activated, anionic polymerisation of lactams having at least five ring members by means of screw injection-moulding machines and screw extruders, the improvement comprises polymerising the lactam melt containing an activator and a catalyst partially in a stirrer unit up to a relative viscosity of at least 1.4 measured at 25° C on a 1% by weight solution of the polyamide in cresol.

Any anionically polymerisable lactams having five ring members, such as for example pyrrolidine, $\epsilon$-caprolactam, lauric lactam, caprylic lactam, oenanthic lactam are suitable for use in the proces according to the invention. It is of particular advantage to use $\epsilon$-caprolactam.

Suitable catalysts include any of the basic catalysts conventionally used for the anionic polymerisation of lactams, for example alkali metal and alkaline earth metal alcoholates, alkali salts of carboxylic acids and alkali borohydrides. The alkyli metal salt, for example the sodium salt, of the particular lactam to be polymerised, is particularly suitable.

Suitable activators include any of the activators conventionally used for the anionic polymerisation of lactams. Particularly suitable activators include aliphatic or aromatic monoisocyanates and polyisocyanates such as stearyl-, phenyl isocyanates, hexamethylene-1,6-diisocyanate, tolylene-2,4-diisocyanate or masked isocyanates such as hexamethylene-1,6-bis-carbamidocaprolactam (O. Bayer "Angewandte Chemie" A.59 (1947) 267), ketenes, carbodiimides and triazines.

The process is carried out in an arrangement of the kind which is illustrated diagrammatically in FIG. 1.

The lactam/catalyst/activator mixture is fused in the melting vessel I from which it passes into the stirrer vessel II, which is heated above the melting temperature or softening temperature of the polyamide to be formed, and is polymerised partially while stirring at temperatures in the range of from 100° to 250° C up to a relative viscosity of at least 1.4. The polymeric melt is further conveyed by the feed screw III of the screw injection-moulding machine or screw extruder, polymerised to completion in the processing machine at temperatures of from 100° to 300° C and thereafter it can either be moulded in moulds or continuously extruded through dies.

Either in the stirrer unit or in the feed unit, fibres and fillers such as glass fibres, asbestos fibres, carbon fibres whiskers, metal fibres, cellulose fibres, plastic fibres, spherical or cylindrical bodies of porcelain, clay, glass or metal can be added to the mixture to increase the mechanical properties of the polyamide mouldings. Molecular weight regulators, pigments and mould-release agents can also be added to the mixture.

The process according to the invention provides for uncomplicated feed of the lactam melt without any need for pressure to be applied for delivering the melt. The production of a moulding takes no more time than would be necessary to fuse a granulate and inject it into the same mould.

EXAMPLE 1

Polymerisation is carried out in a screw injection-moulding machine with a screw 35 mm in diameter and 10 D long. Above the feed opening there is provided a pre-polymerisation vessel with a stirring mechanism and onto the side of the vessel is flanged a melting vessel which is externally heated by electricity.

A polymerisable mixture consisting of 100 parts by weight of caprolactam, 0.5 parts by weight of sodium caprolactamate, 1.0 parts by weight of hexamethylene-1,6-bis-carbamidocaprolactam and 0.6 parts by weight of N-benzyl-acetamide, is introduced into the melting vessel.

This mixture is heated to 80° C and fused. The molten mixture runs through an inclined, heated connecting pipe into a similarly externally heated pipe with a temperature of 180° to 250° C. In this pipe, the mixture is polymerised with stirring until its relative viscosity, measured at 25° C on a 1% solution in cresol in a Uebbelodde viscosimeter, amounts to 1.5 so that it can be taken in by the screw in the absence of pressure. The stirrer continues rotating without interruption in order to avoid disintegration in the melt which, in its initial state, is of extremely low viscosity. The pre-polymerised product is heated in the barrel to 220°–250° C and polymerised to completion. The resulting viscous polyamide is delivered into the restriction zone in front of the screw and, under the effect of the pressure which builds up, pushes the screw into a predetermined position in which the rotation drive is switched off. However, the stirrer continues rotating in the pre-polymerisation zone.

By axially displacing the screw into the starting position, the polyamide formed is injected into a mould in which it solidifies. The time required to produce mouldings weighing 50 g, for example, is 35 seconds.

An equivalent period would also be necessary to produce an identical moulding from a completely polymerised granulate.

EXAMPLE 2

Polymerisation is carried out in the same injection-moulding machine as described in Example 1 under the same working conditions.

In this case, too, the mixture is fused in the melting vessel and pre-polymerised in a stirrer unit up to a viscosity of 1.6 (measured as in Example 1). Thirty parts by weight of glass fibres are added and disintegration of the specifically heavier glass fibres in the pre-polymerisation zone is prevented by the stirrer. The polyamide formed is conveyed by the delivery screw effortlessly. In the barrel the polymeric melt is polymerised to completion at temperatures of from 230° to 250° C after which it is injected through a die into the mould.

EXAMPLE 3

Polymerisation is carried out in the same injection-moulding machine as in Example 1, using a mixture consisting of 1500 parts by weight of lauric lactam, 5 parts by weight of sodium caprolactamate, 10 parts by weight of hexamethylene-1,6-biscarbamidocaprolactam and 5 parts by weight of N-benzyl acetamide.

This mixture is fused at 170° C in the pre-polymerised barrel and pre-polymerised up to a viscosity of 1.55 (measured as in Example 1), delivered to the barrel of the injection-moulding machine heated to 180°– 200° C, polymerised to completion and injected into the mould heated to 60° C. By adopting this procedure, it is possible to produce, for example, a moulding weighing 15 g in a 40-second cycle.

We claim:

1. In an improved process for the production of polyamide mouldings by activated, anionic polymerization of lactams having at least five ring members by means of screw injection-moulding machines and screw extruders, the improvement which comprises: (1) partially polymerizing the lactam melt containing an activator and a catalyst in a stirrer unit while continuously stirring at a temperature of 100° to 250° C, up to a relative viscosity of at least 1.4, measured at 25° C on a 1% by weight solution of the polyamide in cresol; (2) delivering the resultant prepolymerized melt into the feed zone of the screw injection moulding machine or of a screw extruder without applying pressure; (3) transporting the melt into the polymerization part of said machine or extruder by means of a screw at a temperature of from 100° to 300° C; and completing polymerization and thereafter extruding and molding said polymerized melt.

2. A process as claimed in claim 1 wherein pyrrolidone, 8-caprolactam, caprylic lactam, oenanthic lactam or lauric lactam is polymerized.

* * * * *